United States Patent
Matsumoto et al.

(10) Patent No.: US 10,035,409 B2
(45) Date of Patent: Jul. 31, 2018

(54) LINK STRUCTURE OF STORING-TYPE ROOF OF AUTOMOTIVE VEHICLE

(71) Applicants: MAZDA MOTOR CORPORATION, Hiroshima (JP); Webasto Japan Co., Ltd., Hiroshima (JP)

(72) Inventors: Kouichi Matsumoto, Hiroshima (JP); Koji Sawahata, Higashihiroshima (JP); Takeshi Mizoguchi, Higashihiroshima (JP)

(73) Assignees: MAZDA MOTOR CORPORATION, Hirschima (JP); Webasto Japan Co., Ltd., Hirschima (JP)

( * ) Notice: Subject to any disclaimer, the term of this patent is extended or adjusted under 35 U.S.C. 154(b) by 0 days.

(21) Appl. No.: 15/459,505

(22) Filed: Mar. 15, 2017

(65) Prior Publication Data
US 2017/0267079 A1 Sep. 21, 2017

(30) Foreign Application Priority Data
Mar. 18, 2016 (JP) .................................. 2016-054754

(51) Int. Cl.
*B60J 7/12* (2006.01)
(52) U.S. Cl.
CPC ........... *B60J 7/1204* (2013.01); *B60J 7/1269* (2013.01)
(58) Field of Classification Search
CPC ......... B60J 7/1204; B60J 7/1269; B60J 7/146

USPC ....... 296/108, 115, 117, 112, 107.07, 107.12
See application file for complete search history.

(56) References Cited

U.S. PATENT DOCUMENTS

| | | | | |
|---|---|---|---|---|
| 2,632,670 | A * | 3/1953 | Crenshaw | B60J 7/026 296/117 |
| 4,776,630 | A * | 10/1988 | Fukutomi | B60J 7/028 296/107.17 |
| 5,671,966 | A * | 9/1997 | Busch | B60J 7/1269 296/107.16 |
| 2002/0105205 | A1* | 8/2002 | Willard | B60J 7/1692 296/107.07 |
| 2003/0230907 | A1* | 12/2003 | Sasaki | B60J 1/1823 296/7 |
| 2010/0283286 | A1 | 11/2010 | Odoi et al. | |
| 2011/0227364 | A1* | 9/2011 | Neubrand et al. | B60J 7/1265 296/108 |
| 2016/0089966 | A1* | 3/2016 | Matsumoto | B60J 7/146 296/107.08 |

* cited by examiner

*Primary Examiner* — Jason S Morrow
(74) *Attorney, Agent, or Firm* — Studebaker & Brackett PC

(57) ABSTRACT

There provided an openable roof, a link mechanism foldably supporting the openable roof, and a drive device to drive a drive link of a link mechanism. The drive device comprises a drive unit including a drive gear connected to a drive motor, a driven gear provided at the drive link, and an intermediate gear engaging with the drive gear and the driven gear. The drive unit is located at a lower level than a beltline of the vehicle body, the driven-gear pivotal portion is located at a higher level than the beltline, and the intermediate gear is located at a specified level such that the intermediate gear overlaps the beltline in a side view.

4 Claims, 9 Drawing Sheets

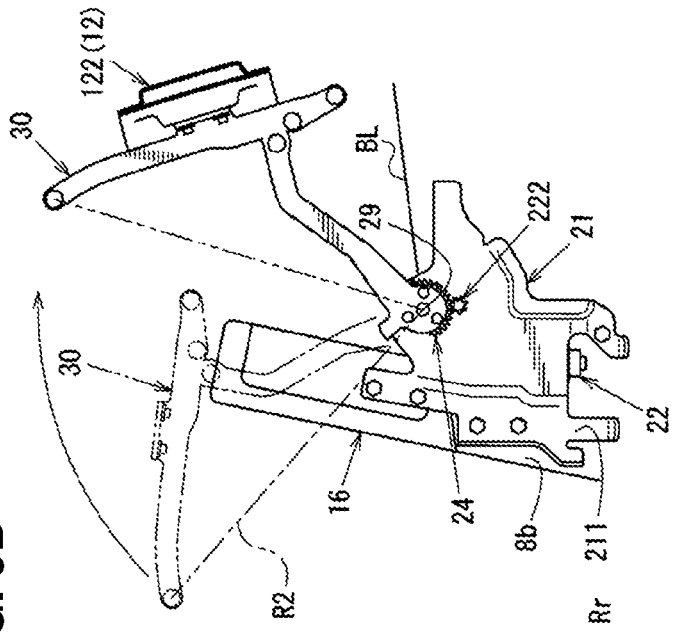
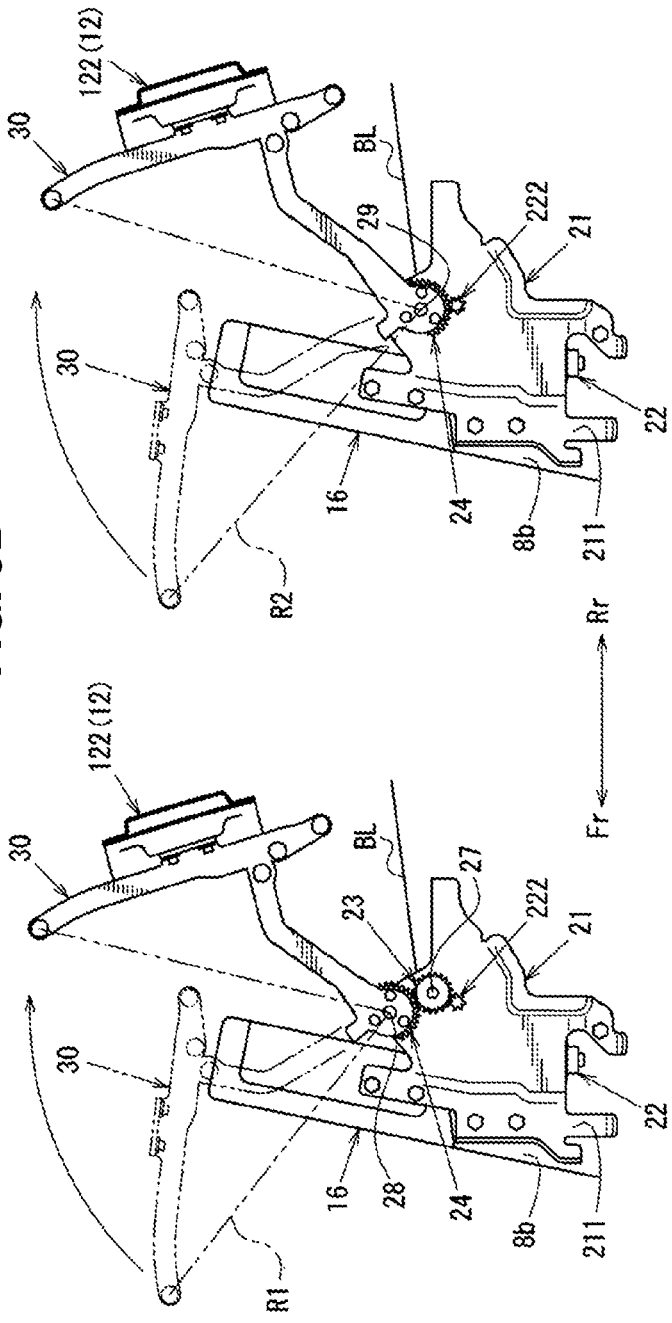

LINK STRUCTURE OF STORING-TYPE ROOF OF AUTOMOTIVE VEHICLE

BACKGROUND OF THE INVENTION

The present invention relates to a link structure of a storing-type roof of an automotive vehicle which comprises a storing-type roof configured to cover an opening formed above a cabin, a link mechanism foldably supporting the storing-type roof, and a drive device to drive the link mechanism.

A design line which extends, in a vehicle longitudinal direction, along a lower end of a window glass, i.e., a so-called beltline is provided at a side face of a vehicle body of an automotive vehicle. It is known that this beltline is a design factor to determine an impression of a vehicle appearance by its inclination or emphasis conditions. For example, in a sedan type of vehicle which needs to give a serene impression, the beltline is generally formed substantially in a horizontal shape in a side view.

Meanwhile, in a vehicle which needs to give a sporty impression, the beltline is generally configured in a slant shape such that its rear side is elevated in the side view. Further, in this kind of vehicle, the sporty feeling can be emphasized by configuring the beltline such that its rear side is positioned on an inward side, in a vehicle width direction, of the vehicle relative to its front side (i.e., a throttling shape), thereby giving energetic feeling, and/or by configuring the vehicle such that a vehicle height is relatively low.

Meanwhile, in the automotive vehicle which comprises the storing-type roof configured to openably cover the opening formed above the cabin in which a passenger gets in, i.e., in a so-called open car, the above-described beltline serves as a peripheral edge of an opening which is formed at a vehicle body for storing the storing-type roof in the vehicle body.

For example, U.S. Patent Application Publication No. 2010/0283286 A1 discloses a retractable roof 2 (the storing-type roof) which is storable in the vehicle body through the opening formed at the vehicle body which has the peripheral edge along the beltline in the automotive vehicle having the beltline configured in the slant shape such that its rear side is elevated in the side view.

The retractable roof 2 of the above-described patent document is openably supported by a link mechanism pivotally supported at a rotational axis X which is located in back of a side door and at a lower level than the beltline.

In the structure of the above-described patent document, the distance between the rotational axis X of the link mechanism and a front roof panel 21 covering over a cabin tends to be so long that a radius of rotation of an opening/closing locus of the storing-type roof become large.

However, in a case where the beltline configured such that its rear side is positioned on the inward side, in the vehicle width direction, of the vehicle relative to its front side (i.e., the throttling shape) is desired in order to emphasize the sporty feeling, for example, the opening which is formed at the vehicle body for storing the storing-type roof in the vehicle body is configured such that its rear side becomes narrower.

Therefore, in a case of the storing-type roof having the large radius of rotation like the one disclosed in the above-described patent document, since the opening/closing locus of the storing-type roof overlaps a narrow portion of the opening formed at the vehicle body or overlaps a floor face of the storing compartment where the storing-type roof is stored, there is a concern that the storing-type roof may not be storable in the vehicle body.

Further, in a case where the vehicle equipped with the storing-type roof having the large radius of rotation like the one disclosed in the above-described patent document is configured such that the vehicle height is high for securing a deep floor face of the storing compartment relative to the beltline or that the vehicle longitudinal length is long, in order that the opening/closing locus of the storing-type roof and the storing compartment do not overlap each other, there is a concern that the sporty feeling may be damaged.

As described above, there is a problem that the open car equipped with the storing-type roof having the large rotational radius disclosed in the above-described patent document may not compatibly attain the desired-shaped beltline and the storing of the storing-type roof in the vehicle body.

SUMMARY OF THE INVENTION

The present invention has been devised in view of the above-described problem, and an object of the present invention is to provide a link structure of a storing-type roof of an automotive vehicle which can compatibly attain storing of the storing-type roof in the vehicle body and arranging of a drive device to drive the link mechanism at the vehicle body and the desired-shaped beltline.

This object is solved by the link structure of the storing-type roof of the automotive vehicle according to the present invention of the independent claim. Preferred embodiments of the present invention are subject of the other dependent claims.

The present invention is a link structure of a storing-type roof of an automotive vehicle, comprising a storing-type roof configured to openably cover an opening formed above a cabin and be stored in a storing compartment of the vehicle body, a link mechanism including a drive link pivotally supported at a vehicle body via a pivotal portion and foldably supporting the storing-type roof, and a drive device to rotationally drive the drive link around a rotational axis of the pivotal portion, wherein the drive device comprises a drive unit including a drive motor and a drive gear connected to the drive motor, a driven gear provided at the drive link and having a gear shaft center thereof which matches the pivotal portion of the drive link, and an intermediate gear engaging with the drive gear and the driven gear, the drive unit is located at a lower level than a beltline of the vehicle body, the pivotal portion is located at a higher level than the beltline of the vehicle body, and the intermediate gear is located on an inward side, in a vehicle width direction, of the drive motor and at a specified level such that the intermediate gear overlaps the beltline of the vehicle body in a side view.

The above-described storing-type roof can be a soft top made of an awning cloth and an awning bow, or a hard top composed of a metal-made or synthetic resin-made roof. The above-described drive gear connected to the drive motor can be a gear provided at an output shaft of the drive motor or a gear engaging with a gear provided at the drive motor. The above-described driven gear can be a gear formed independently (separately) from the drive link or a gear formed integrally with the drive link. The above-described beltline can be a design line extending in a vehicle longitudinal direction along a lower end of a window glass provided at a vehicle-body side face.

According to the present invention, the storing of the storing-type roof in the vehicle body and the arranging of the drive device to drive the link mechanism at the vehicle body and the desired-shaped beltline can be compatibly attained. Specifically, the present link structure of the storing-type roof of the automotive vehicle can easily arrange the pivotal portion at the higher level than the beltline by locating the intermediate gear at the specified level such that the intermediate gear overlaps the beltline in the side view.

Accordingly, the present link structure of the storing-type roof of the automotive vehicle can make the distance between the pivotal portion and the storing-type roof shorter than that in a case where the pivotal portion is located at a lower level than the beltline, that is, the radius of rotation of the opening/closing locus of the string-type roof can be properly small.

Thereby, even in the case where the beltline is configured in the slant shape such that its rear side is elevated in the side view and/or the beltline is configured such that its rear side is positioned on the inward side, in the vehicle width direction, of the vehicle relative to its front side (i.e., the throttling shape), the present link structure of the storing-type roof of the automotive vehicle can prevent the opening/closing locus of the storing-type roof from overlapping the narrow portion of the beltline or the floor face of the storing compartment. That is, even in the case where the beltline is configured in the slant shape such that its rear side is elevated in the side view and/or the beltline is configured such that its rear side is positioned on the inward side, in the vehicle width direction, of the vehicle relative to its front side (i.e., the throttling shape), the present link structure of the storing-type roof of the automotive vehicle can eliminate the necessity of making the whole length of the automotive vehicle long or making the vehicle height high.

Accordingly, even in the case where the beltline is desired to have the slant shape with its rear side elevating in the side view and/or to have the throttling shape with its rear side positioned on the inward side, the present link structure of the storing-type roof of the automotive vehicle can easily secure the storing compartment having the opening which is large enough to store the storing-type roof.

Further, the present link structure of the storing-type roof of the automotive vehicle can not only increase layout flexibility of the drive unit by setting an outer diameter and a vertical positon of the intermediate gear properly but secure a large cabin space between the right-and-left beltlines properly, compared to a case where the drive unit is provided on the inward side, in the vehicle width direction, of the beltline, for example. Thus, the present link structure of the storing-type roof of the automotive vehicle can compatibly attain the storing of the storing-type roof in the vehicle body and the arranging of the drive device to drive the link mechanism at the vehicle body and the desired-shaped beltline.

In an embodiment of the present invention, the intermediate gear is provided such that a gear shaft center thereof is positioned in back of an imaginary straight line which connects a gear shaft center of the drive gear and the gear shaft center of the driven gear in the side view.

According to this embodiment, the present link structure of the storing-type roof of the automotive vehicle can compatibly attain the desired-shaped beltline and the storing of the storing-type roof in the vehicle body and also make the drive device properly small-sized.

Specifically, the distance, in the vehicle vertical direction, between the gear shaft center of the driven gear and the gear shaft center of the drive gear can be smaller than that in a case where the gear shaft center of the driven gear, the gear shaft center of the intermediate gear, and the gear shaft center of the drive gear are aligned in the vehicle vertical direction, for example.

Therefore, since the distance, in the vehicle vertical direction, between the drive unit and the driven gear can be small, the small-sized drive device to drive the drive link can be attained.

Further, since the driven gear, the intermediate gear, and the drive gear are arranged such that an imaginary straight line which connects the gear shaft center of the driven gear, the gear shaft center of the intermediate gear, and the gear shaft center of the drive gear forms substantially a triangle in the side view, in other words, the driven gear, the intermediate gear, and the drive gear are arranged substantially in a V shape opening forward in the side view, the present link structure of the storing-type roof of the automotive vehicle can create a specified space in front of the intermediate gear.

This specified space is located at a position crossing a rotational locus of the drive link, so that the present link structure of the storing-type roof of the automotive vehicle can arrange a stopper to restrict the rotation of the drive link or the like in the specified space, for example. Thereby, the present link structure of the storing-type roof of the automotive vehicle can have the stopper to restrict the rotation of the drive link or the like, attaining the small-sized drive device.

Thus, the present link structure of the storing-type roof of the automotive vehicle can compatibly attain the desired-shaped beltline and the storing of the storing-type roof in the vehicle body and also make the drive device properly small-sized by means of the intermediate gear having the gear shaft center which is positioned in back of the imaginary straight line connecting the gear shaft center of the drive gear and the gear shaft center of the driven gear.

In another embodiment of the present invention, the drive link of the link mechanism is configured such that one end thereof is pivotally supported at the pivotal portion and the other end thereof is connected to the roof.

According to this embodiment, the present link structure of the storing-type roof of the automotive vehicle can improve the support rigidity of the storing-type roof.

Specifically, since the pivotal portion and the storing-type roof can be connected by a single member, compared to a case where the storing-type roof is supported by the drive link pivotally supported at the pivotal portion and the driven link pivotally supported at the drive link, the present link structure of the storing-type roof of the automotive vehicle can improve the support rigidity of the storing-type roof.

Thus, the present link structure of the storing-type roof of the automotive vehicle can not only compatibly attain the desired-shaped beltline and the storing of the storing-type roof in the vehicle body but improve the support rigidity of the storing-type roof.

Other features, aspects, and advantages of the present invention will become apparent from the following description which refers to the accompanying drawings.

BRIEF DESCRIPTION OF THE DRAWINGS

FIGS. 9A and 9B are explanatory diagrams explaining moves of the drive link in an opening/closing process of the openable roof.

DETAILED DESCRIPTION OF THE INVENTION

Figure 1:
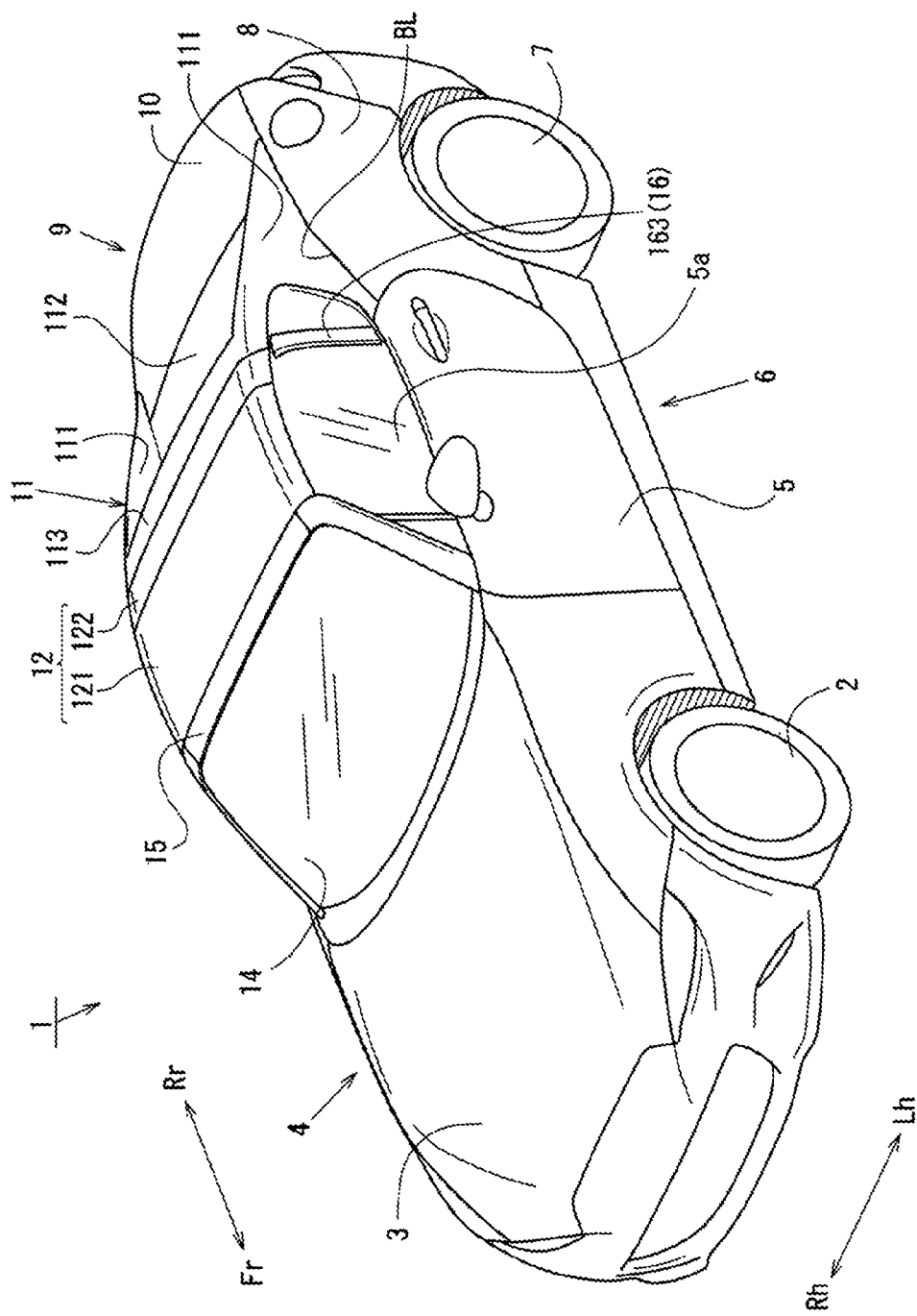
FIG. 1 is a perspective view showing appearance of an automotive vehicle in a state in which an openable roof is closed.

An embodiment of the present invention will be described specifically referring to the drawings. First, an automotive vehicle 1 of the present embodiment will be described specifically referring to FIGS. 1-5.

Figure 2:
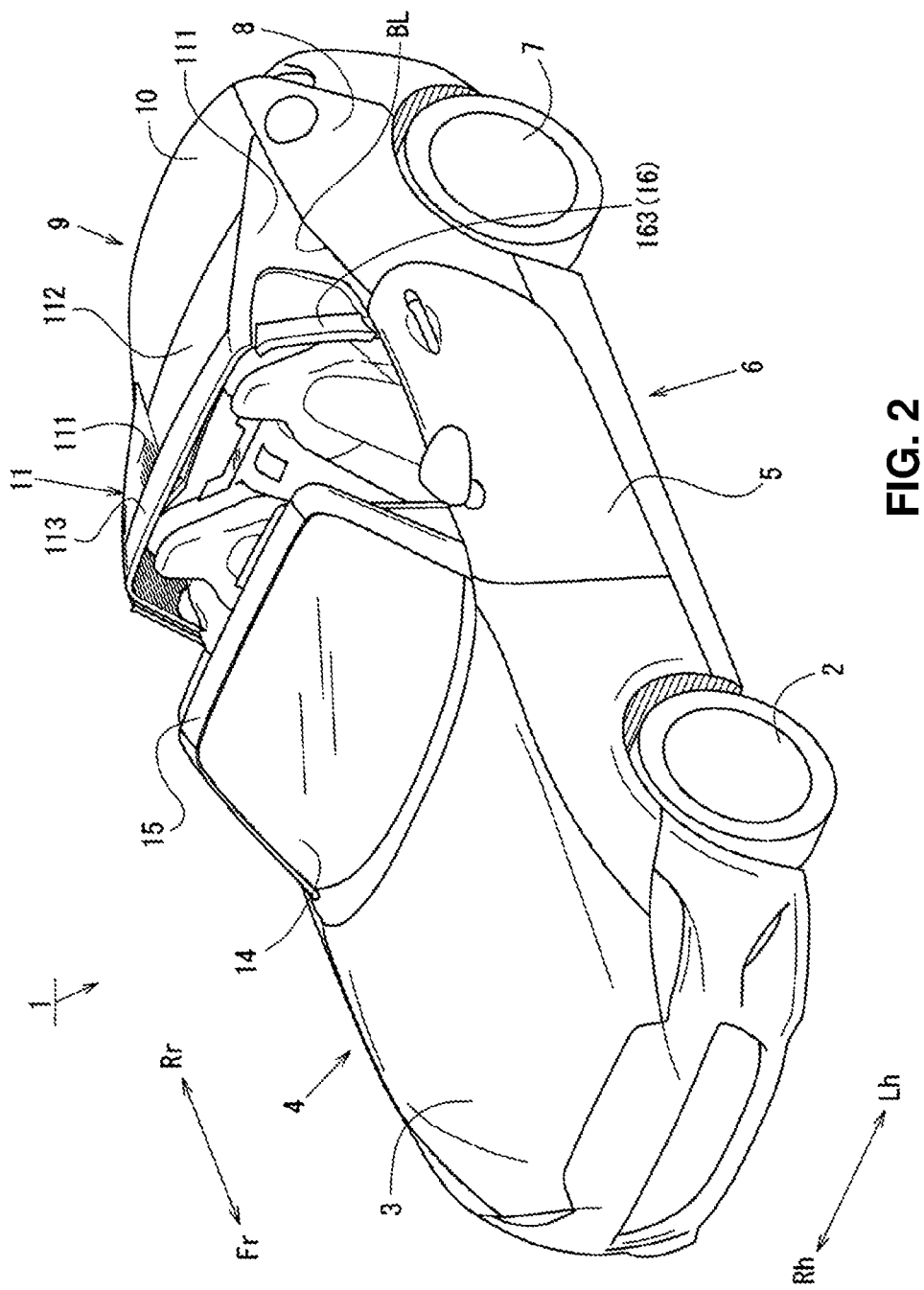
FIG. 2 is a perspective view showing the appearance of the automotive vehicle in a state in which the openable roof is open.
Figure 3:
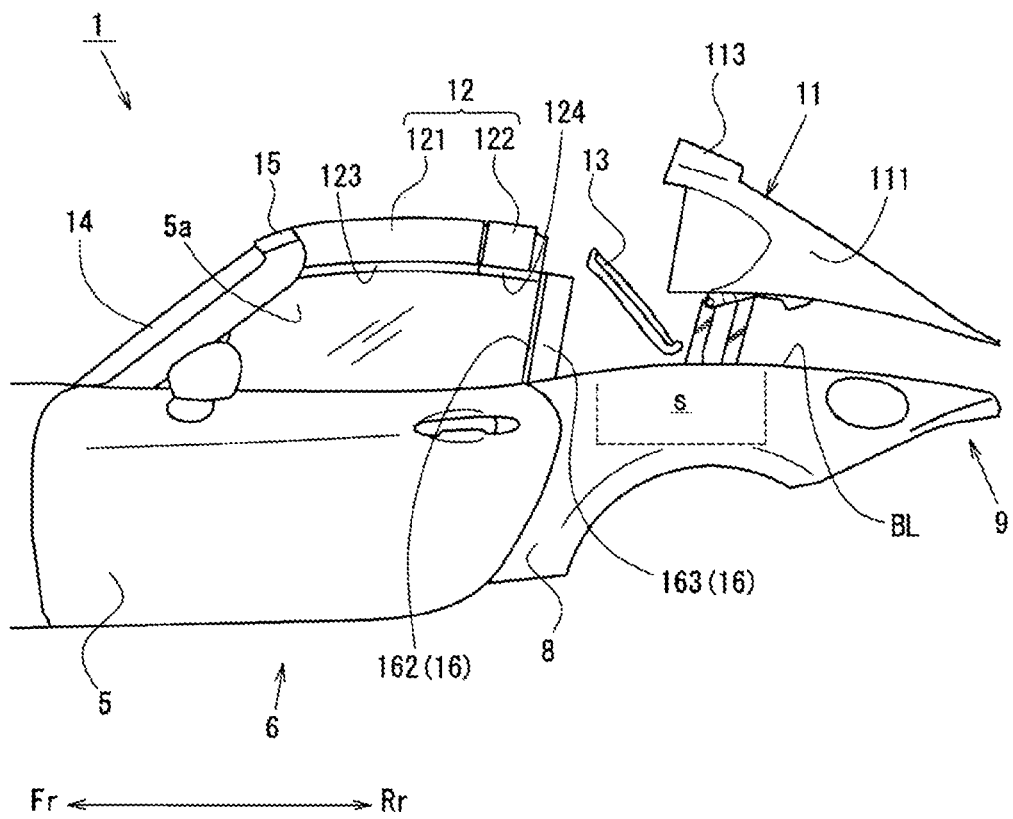
FIG. 3 is a left side view showing the appearance of the automotive vehicle in a process of storing of the openable roof.
Figure 4:
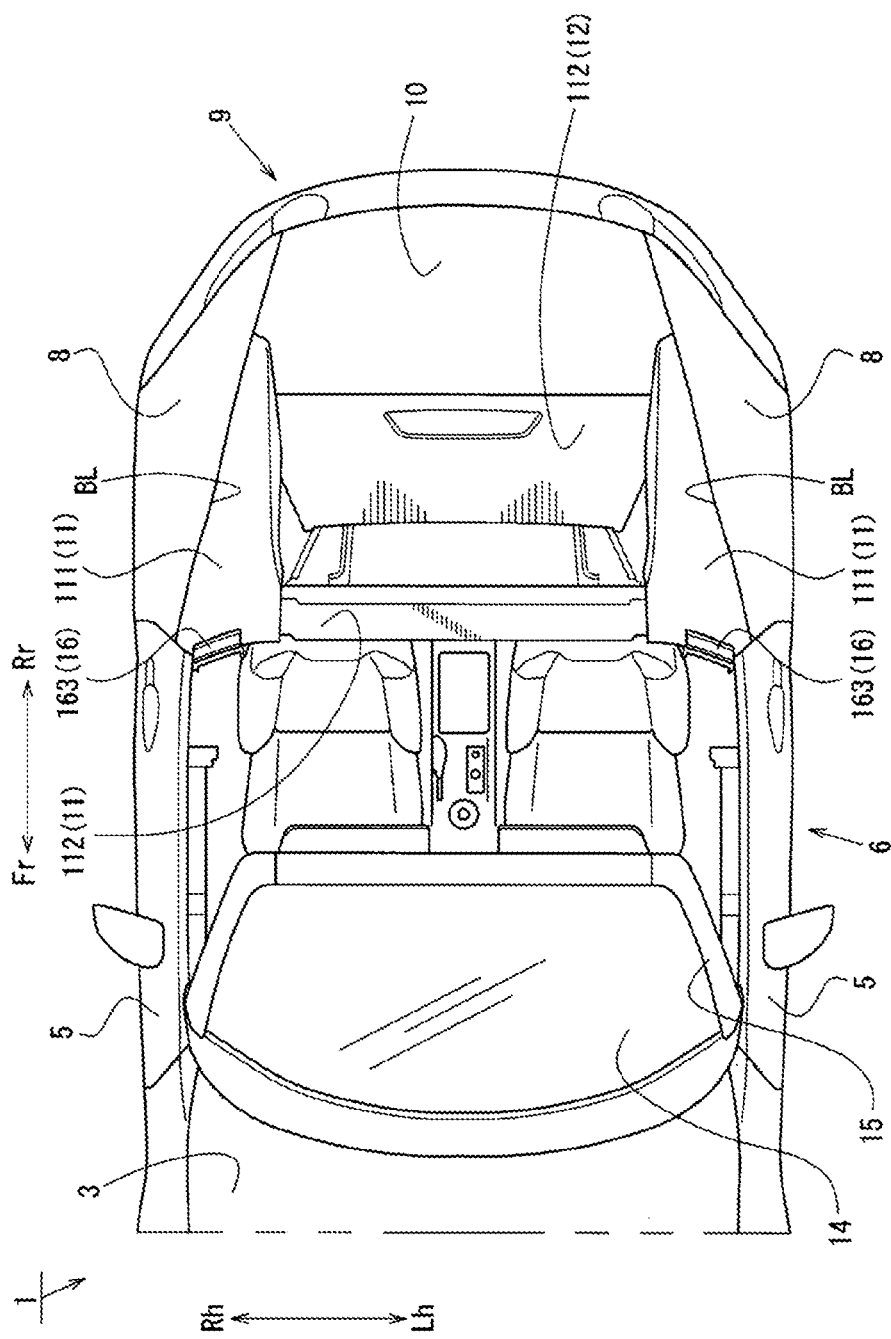
FIG. 4 is a plan view showing the appearance of the automotive vehicle in the state in which the openable roof is open.
Figure 5:
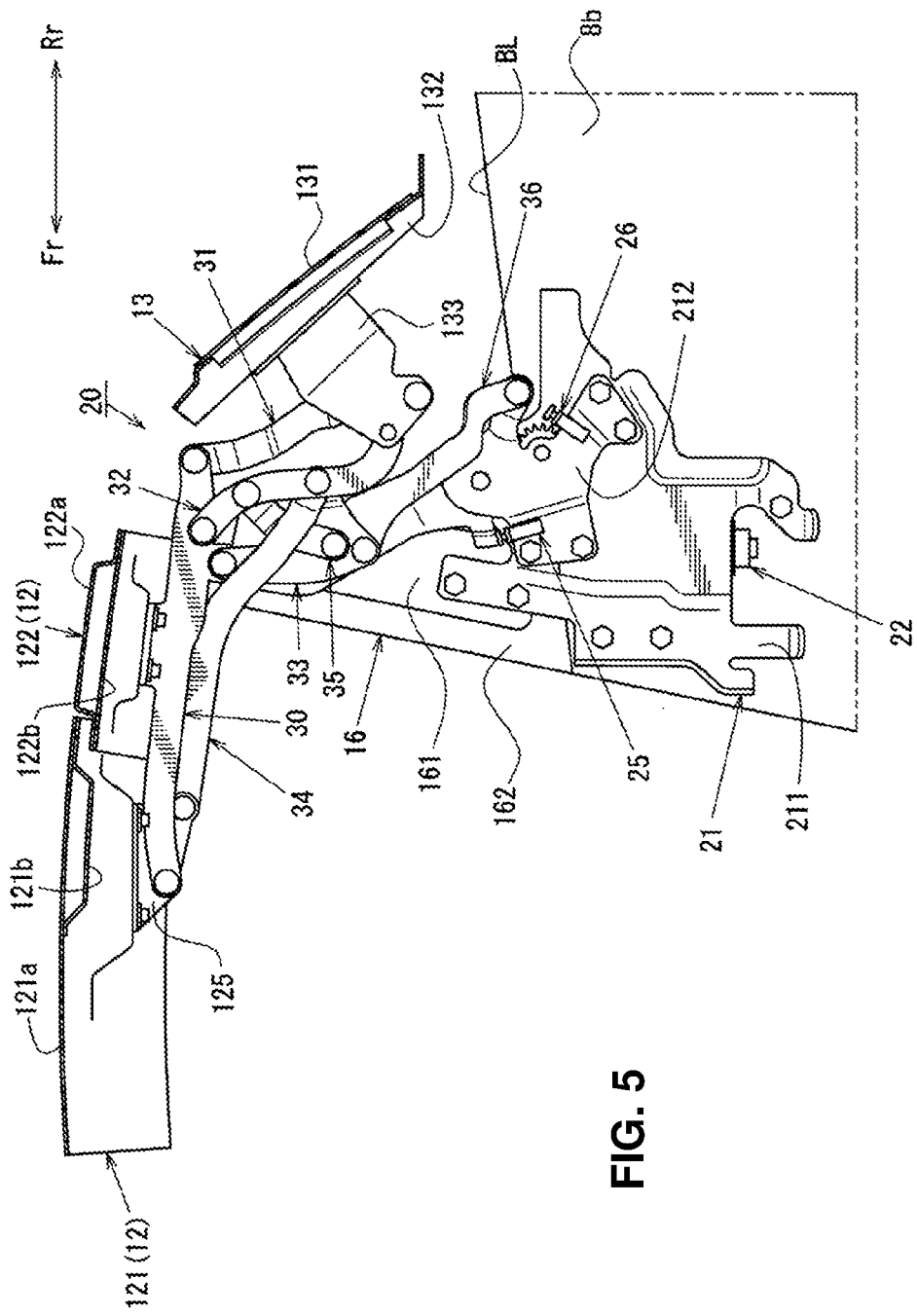
FIG. 5 is a left side view of a roof opening/closing mechanism, when viewed from an inside of a cabin.

Herein, FIG. 1 shows a perspective view showing appearance of the automotive vehicle 1 in a state in which an openable roof 12 is closed, FIG. 2 shows a perspective view showing the appearance of the automotive vehicle 1 in a state in which the openable roof 12 is open, FIG. 3 shows a left side view showing the appearance of the automotive vehicle 1 in a process of storing of the openable roof 12, FIG. 4 shows a plan view showing the appearance of the automotive vehicle 1 in the state in which the openable roof 12 is open, and FIG. 5 shows a left side view of a roof opening/closing mechanism 20, when viewed from an inside of a cabin.

Illustration of the roof opening/closing mechanism 20 of the openable roof 12 is omitted in FIG. 3 and illustration of a deck cover 11 is omitted in FIG. 5 for simplification. Further, in the drawings, arrows Fr, Rr show a vehicle longitudinal direction, the arrow Fr showing a vehicle forward side and the arrow Rr showing a vehicle rearward side. Arrows Rh, Lh show a vehicle width direction, the arrow Rh showing a vehicle rightward side and the arrow Lh showing a vehicle leftward side. Additionally, an upper side of the figures is a vehicle upward side and a lower side of the figures is a vehicle downward side.

First, the automotive vehicle 1 of the present embodiment comprises, as shown in FIGS. 1 and 2, a vehicle front portion 4 where front wheels 2 and a bonnet (engine hood) 3 are arranged, a cabin portion 6 where doors 5 are arranged and passengers ride, and a vehicle rear portion 9 where rear wheels 7 and rear fenders 8 are arranged, which are provided in order from the vehicle forward side.

Further, as shown in FIGS. 1 through 3, the vehicle rear portion 9 includes a storing portion (not illustrated) which comprises a storing compartment S having an opening at its upward side and the deck cover 11 to close the opening of the storing compartment S. This storing portion is formed in front of a trunk lid 10 and between right-and-left rear fenders 8.

The automotive vehicle 1 is, as shown in FIGS. 1 through 3, a so-called open car in which the openable roof 12 which covers an upper portion of the cabin portion 6 and a back window portion 13 which is positioned in back of the cabin portion 6 are storable in the storing compartment S.

More specifically, the storing compartment S is, as shown in FIGS. 1 through 3, configured to open upward along a beltline BL and have an inner space which is large enough to store the openable roof 12 and the back window portion 13 which are positioned in a folded state therein.

Herein, the beltline BL of the automotive vehicle 1 can be designed such that it extends along a line from a lower end of a door glass 5a of the door 5 to an upper end of the rear fender as shown in FIGS. 3 and 4. A rear part of this beltline BL which is positioned behind the door 5 is configured such that it extends upward and rearward and a width, in the vehicle width direction, of a rear side thereof is smaller than that of a front side thereof.

Meanwhile, as shown in FIGS. 1 through 3, the deck cover 11 covering the opening of the storing compartment S forms part of the automotive vehicle 1 which is positioned above the beltline BL and in back of a rear end of the door 5.

The deck cover 11 has a lower end which extends along the beltline BL, and comprises a pair of right-and-left cover side portions 111 which face each other in the vehicle width direction, a cover base portion 112 which interconnects respective lower portions of the cover side portions 111, and a cover header portion 113 which interconnects respective upper portions of the cover side portion 111.

Herein, the deck cover 11 is connected to the rear fenders 8 via a four-joint link mechanism so as to be automatically opened or closed by using a switch operated by a passenger.

Further, the openable roof 12 comprises, as shown in FIGS. 1 and 2, a front roof 121 which is detachably connected to a window frame 15 supporting an upper portion of a front window glass 14 and a rear roof 122 which is positioned in back of the front roof 121.

As shown in FIGS. 3 and 5, the front roof 121 has a longitudinal length which is greater than a half of a length of an upper portion of the cabin portion 6, and comprises a metal-made upper panel 121a which forms an exterior design face and a metal-made lower panel 121b which faces the upper panel 121a at a vehicle lower side, which are integrally joined together.

Herein, as shown in FIG. 3, front weather strip rubbers 123 are attached to both ends, in the vehicle width direction, of the front roof 121 so as to seal each gap between the front roof 121 and the door glass 5a. Each front weather strip rubber 123 has a drain passage to drain rain water and the like flowing down along a surface of the upper panel 121a toward the vehicle rearward side.

As shown in FIGS. 3 and 5, the rear roof 122 has a specified size such that its front end is positioned closely to the front roof 121 and its rear end is positioned closely to the cover header portion 113 of the deck cover 11, and comprises a metal-made upper panel 122a which forms an exterior design face and a metal-made lower panel 122b which faces the upper panel 122a at a vehicle lower side, which are integrally joined together.

Herein, a weather strip rubber (not illustrated) is attached to a front end of the rear roof 122 so as to seal a gap between the rear roof 122 and the front roof 121, and a weather strip rubber (not illustrated) is attached to a rear end of the rear roof 122 so as to seal a gap between the rear roof 122 and the cover header portion 131 of the deck cover 11.

Moreover, as shown in FIG. 3, rear weather strip rubbers 124 are attached to both ends, in the vehicle width direction, of the rear roof 122 so as to seal each gap between the rear roof 122 and the door glass 5a. Each rear weather strip rubber 124 has a drain passage to drain the rain water and the like flowing down from the front weather strip rubber 123 to a pillar weather strip rubber 162 which will be described later.

As shown in FIG. 5, the back window portion 13 comprises a back window glass 131 which has transparency, a back window frame 132 which supports the back window glass 131, and a weather strip rubber (not illustrated) which is attached to a peripheral edge of the back window frame 132.

Further, a pair of right-and-left back window brackets 133, to which a roof opening/closing mechanism 20, which will be described later, is connected, are fixed to a front face side of the back window frame 132 so as to face each other in the vehicle width direction.

The automotive vehicle 1 provided with the openable roof 12 and the back window portion 13 which are configured as described above is configured to perform storing of the openable roof 12 and the back window portion 13 in the storing compartment S and deploying of the openable roof 12 and the back window portion 13 which have been stored by means of the pair of right-and-left roof opening/closing mechanisms 20 provided at the rear fenders 8.

The roof opening/closing mechanisms 20 will be described specifically described referring to FIGS. 5 through 9A, B. Herein, since the left-side arranged roof opening/closing mechanism 20 and the right-side arranged opening/closing mechanism 20 are configured to be symmetrical, the right-side arranged opening/closing mechanism 20 will be described in the present embodiment.

Figure 6:
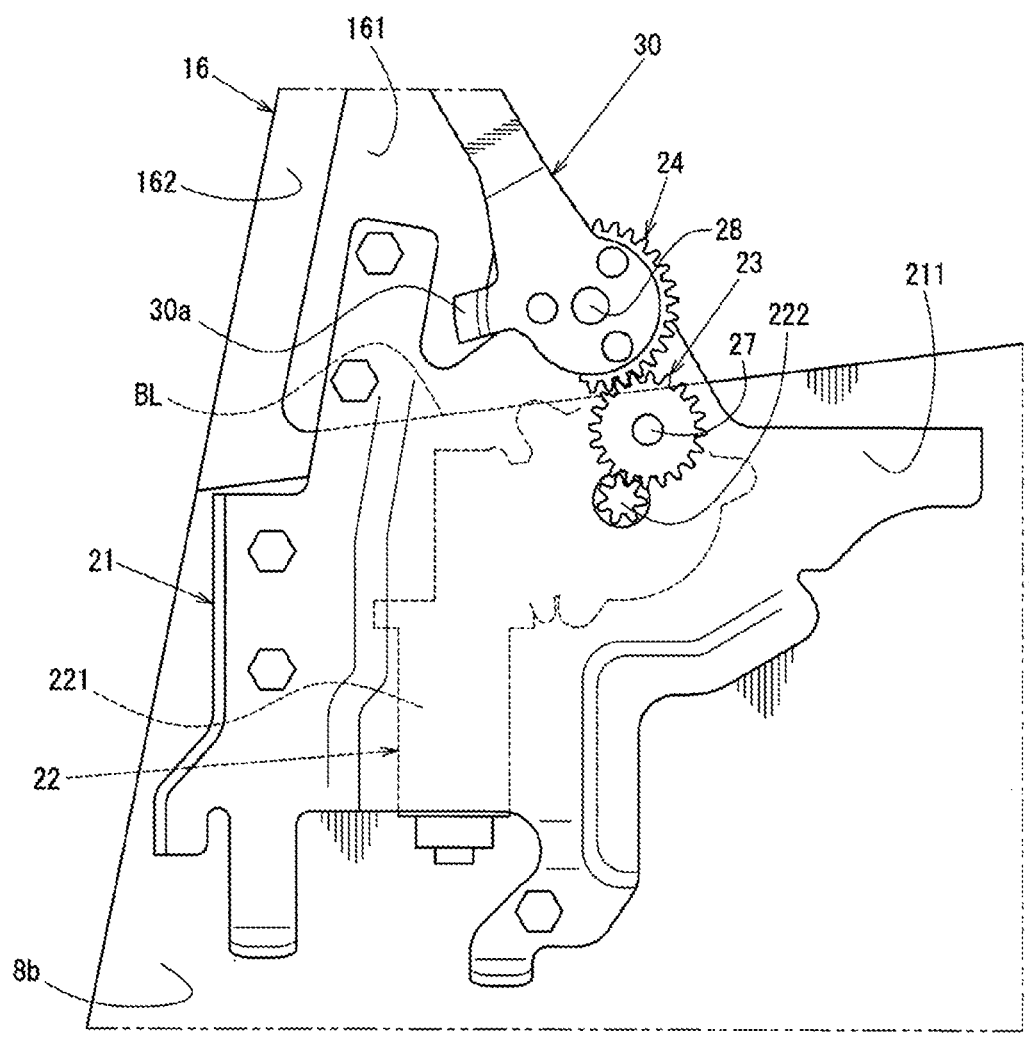
FIG. 6 is an enlarged view of a major part of the roof opening/closing mechanism.
Figure 7:
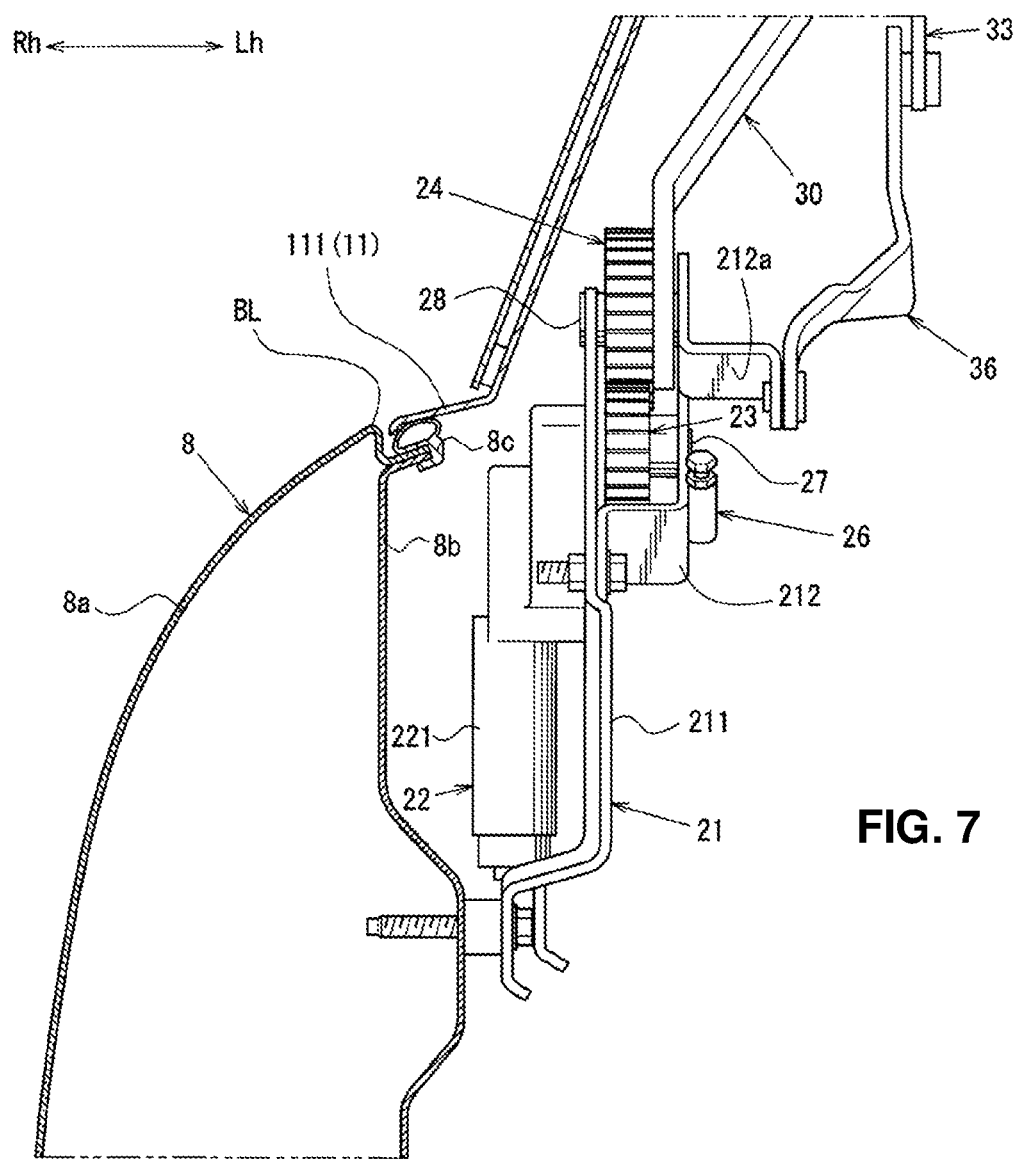
FIG. 7 is a back view of the major part of the roof opening/closing mechanism in a back view.
Figure 8:
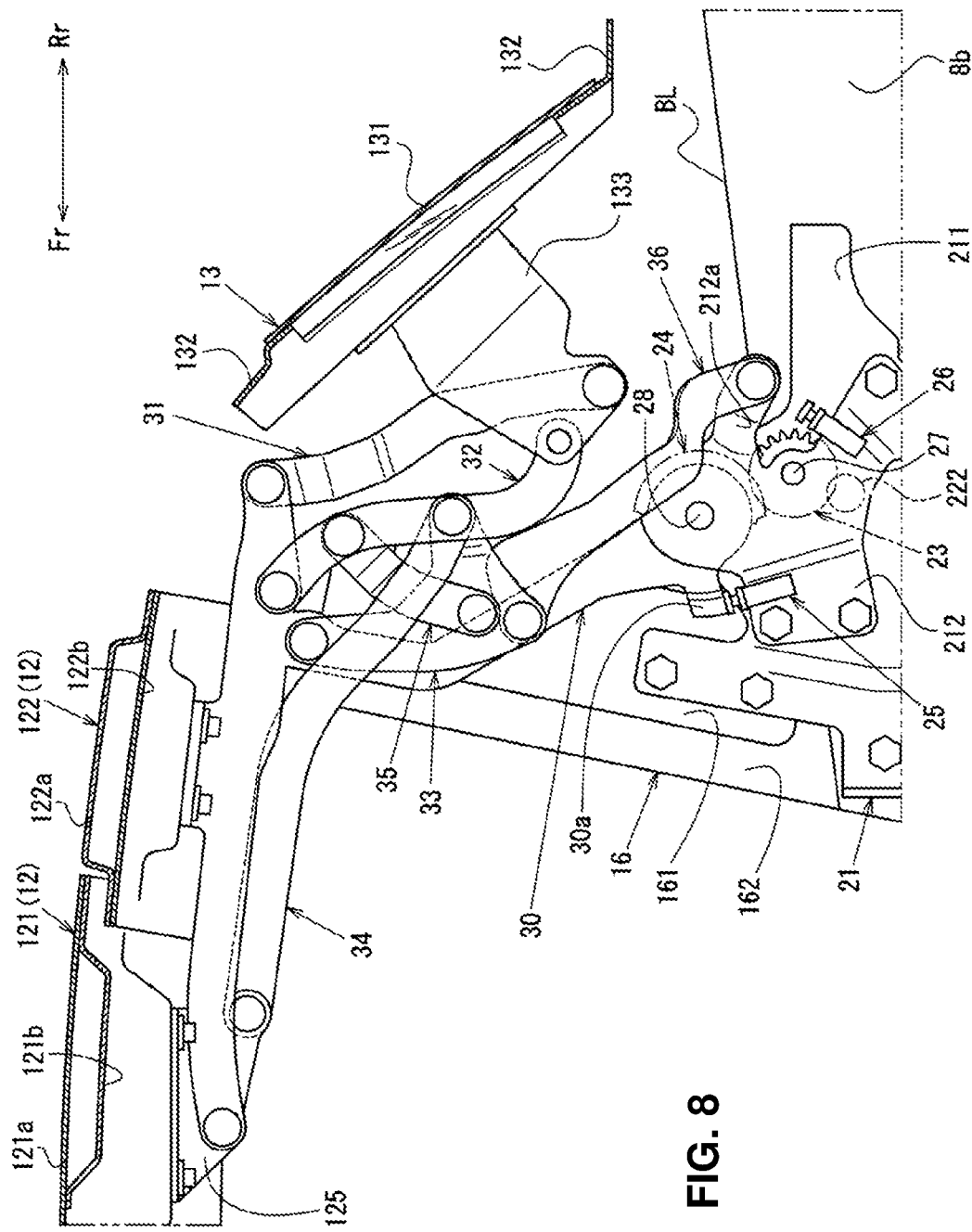
FIG. 8 is a left side view of a drive link and plural driven links, when viewed from the inside of the cabin.

Further, FIG. 6 shows an enlarged view of a major part of the roof opening/closing mechanism 20, FIG. 7 shows a back view of the major part of the roof opening/closing mechanism 20 in a back view, FIG. 8 shows a left side view of the drive link 30 and plural driven links, when viewed from the inside of the cabin, and FIGS. 9A and 9B show explanatory diagrams explaining moves of the drive link 30 in an opening/closing process of the openable roof 12, FIG. 9A showing a left side view of the move of the drive link 30 in the present embodiment and FIG. 9B showing the left side view of the move of the drive link in a case where an intermediate gear 23 does not exist.

For clarification of the major parts, illustration of the deck cover 11 is omitted in FIGS. 6 and 8 and illustration of an inside support bracket 212 is omitted in FIGS. 6 and 9. Further, in FIG. 8, respective gear tooth-tip circles of a drive gear 222, the intermediate gear 23, and a driven gear 24 are shown by two-dotted broken lines.

The rear fender 8 where the roof opening/closing mechanism 20 is arranged is configured to protrude outward, in the vehicle width direction, from the beltline BL, and comprises a metal-made fender outer panel 8a which forms an exterior design face and a metal-made fender inner panel 8b which faces the fender outer panel 8a substantially at the same position in the vehicle width direction relative to the beltline BL, which are integrally joined together (see FIG. 7).

A weather strip rubber 8c is attached to a joint portion of the fender outer panel 8a and the fender inner panel 8b at an upper end edge of the rear fender 8, that is, an opening edge of the storing compartment S so as to seal a gap between the deck cover and the opening edge of the storing compartment S as shown in FIG. 7.

Moreover, as shown in FIGS. 1 through 3, a pillar member 16 which protrudes upward above the beltline BL and exists between the door glass 5a and the deck cover 11 is arranged at a front end of the rear fender 8.

The pillar member 16 comprises, as shown in FIGS. 3 and 5, a pillar body 161 which is connected to the fender inner panel 8b, a pillar weather strip rubber 162 which is attached to the pillar body 161 and seals a gap between the pillar body 161 and the door glass 5a and a gap between the pillar body 161 and the deck cover 11, and a pillar garnish 163 which forms an external design face, which are integrally assembled.

Herein, the pillar weather strip rubber 162 is configured to be connected to the drain passage of the rear weather strip rubber 124 provided at the openable roof 12 in a state where the openable roof 12 is closed, and to have its inner space extending in the vehicle vertical direction. The rain or the like flows into the inner space of the pillar weather strip rubber 162 by way of the rear weather strip rubber 124, and also flows out from a vehicle lower portion through an opening of the vehicle body which is connected to the inner space of the pillar weather strip rubber 162.

The roof opening/closing mechanism 20 provided at the rear fender 8 comprises, as shown in FIGS. 5 and 6, a link support bracket 21 which is fixed to the fender inner panel 8b of the rear fender 8, a link mechanism which is pivotally supported at the link support bracket 21 and supports the openable roof 12 and the back window portion 13, and a drive device which rotates the link mechanism.

More specifically, the drive device comprises a drive unit 22 which is fixed to the link support bracket 21, the intermediate gear 23 which engages with the drive gear 222 of the drive unit 22, and a driven gear 24 which engages with the intermediate gear 23.

Meanwhile, the link mechanism comprises a drive link 30 which supports the openable roof 12 and to which the driven gear 24 is fixed and plural driven links which support the back window portion 13 and are configured to be movable according to the drive link 30.

The link support bracket 21 comprises, as shown in FIGS. 5 and 7, an outward support bracket 211 which is positioned on the inward side, in the vehicle width direction, of the beltline BL and an inward support bracket 212 which is positioned on the inward side, in the vehicle width direction, of the outward support bracket 211.

The outward support bracket 211 comprises, as shown in FIGS. 5 and 7, a roughly flat-plate shaped portion which is fixedly fastened to the fender inner panel 8b of the rear fender and a roughly band shaped portion which protrudes upward above the beltline BL and fixedly fastened to a cabin inward side of the pillar member 16, which are integrally formed. Herein, the roughly flat-plate shaped portion of the outward support bracket 211 is configured to protrude upward above the beltline BL in back of the pillar member 16.

The inward support bracket 212 is fixedly fastened to an inward face, in the vehicle width direction, of the outward support bracket 211 as shown in FIGS. 5 and 7. The inward support bracket 212 is configured in a hat shape in a plan view to have a facing face which fasces the roughly flat-plate shaped portion of the outward support bracket 211.

Further, as shown in FIG. 8, at an upper portion of the inward support bracket 212 is integrally formed a driven link support portion 212a which extends rearward and pivotally supports a sixth driven link 36, which will be described later, at a specified position such that the driven link support portion 212a overlaps the beltline BL in the side view.

Between the outward support bracket 211 and the inward support bracket 212 are arranged a lower end of the drive link 30 equipped with a driven gear 24, which will be described later, the intermediate gear 23, and the drive gear 222 in order from the vehicle upward side as shown in FIGS. 6 through 8.

Additionally, at the inward face, in the vehicle width direction, of the inward support bracket 212 are provided, as shown in FIG. 8, a first stopper portion 25 to restrict a forward-and-downward rotation of the drive link 30 in the state where the openable roof 12 is closed and a second stopper portion 26 to restrict a rearward-and-downward rotation of the drive link 30 in the state where the openable roof 12 is stored.

The first stopper portion 25 is positioned in front of an imaginary straight line which connects a rotational center, which will be described later, of the drive gear 222 and a rotational center (a driven gear pivotal portion 28) of the driven gear 24 in the side view. The second stopper portion 26 is positioned closely to a rearward-and-downward side of the intermediate gear 23, which will be described later, in the side view.

The drive unit 22 is positioned between the outward support bracket 211 and the fender inner panel 8b and fixedly fastened to the outward support bracket 211 as shown in FIGS. 6 and 7. This drive unit 22 is integrally configured such that an electrical drive motor 221, a worm gear (not illustrated) rotated by a drive force of the drive motor 221 and others are stored in its housing (not illustrated).

The drive unit 22 is configured to transfer the rotation of the drive motor 221 having a rotational shaft extending substantially in the vehicle vertical direction to a rotation of its rotational shaft extending in the vehicle width direction by means of the worm gear.

More specifically, the worm gear of the drive unit 22 comprises a worm (not illustrated) which is provided at an output shaft of the drive motor 221 and a worm wheel (not illustrated) which is pivotally supported at the housing as the above-described rotational shaft extending in the vehicle width direction. Further, a drive gear 222 (see FIG. 6) which has a smaller diameter than the worm wheel is integrally formed at the worm wheel of the drive unit 22.

The drive gear 222 is integrally formed at the worm wheel substantially coaxially with a rotational center of the worm wheel such that it is positioned on the inward side, in the vehicle width direction, of the worm wheel. This drive gear 222 is configured to be exposed to the inward side, in the vehicle width direction, of the outward support bracket 211 through an opening which is formed at the outward support bracket 211 below the beltline BL in a state where the outward support bracket 211 is attached as shown in FIG. 6.

Further, the intermediate gear 23 is configured to have a larger diameter than the drive gear 222, have its rotational shaft extending in the vehicle width direction, and engage with the drive gear 222. This intermediate gear 23 is arranged substantially at the same position as the drive gear 222 in the vehicle width direction.

Moreover, the intermediate gear 23 is pivotally supported at the outward support bracket 211 and the inward support bracket 212 such that its rotational center is positioned in back of the imaginary straight line which connects the rotational center of the drive gear 222 and the rotational center (the driven gear pivotal portion 28 which will be described later) of the driven gear 24, which will be described later, in the side view.

Specifically, the rotational center of the intermediate gear 23 is positioned above and in back of the rotational center of the drive gear 222, and pivotally supported at a specified position such that its upper portion overlaps the beltline BL in the side view. Herein, a pivotally-supporting portion of the link support bracket 21 to the intermediate gear 23 is set to be an intermediate-gear pivotal support portion 27.

The driven gear 24 is configured to have a larger diameter than the intermediate gear 23 and engage with the intermediate gear 23, having its rotational shaft extending in the vehicle width direction as shown in FIGS. 6 and 7. More specifically, the driven gear 24 is formed in a roughly fan shape having an arc portion extending over a roughly half of its peripheral direction, and plural teeth to engage with the intermediate gear 23 are formed at the arc portion.

As shown in FIGS. 5 and 6, the driven gear 24 is provided such that its arc portion is positioned on the vehicle rearward side in a state where the openable roof 12 is closed, and fixed to a lower end of the drive link 30.

As shown in FIG. 8, the drive link 30 to which the driven gear 24 is fixed comprises a band-shaped portion which has a longer longitudinal-length than the rear roof 122 and a band-shaped portion which extends downward from the above-described band-shaped portion, which are integrally formed in a roughly-T shape in the side view.

Moreover, at a lower end of the vertically-long band-shaped portion of the drive link 30 is integrally formed a contact portion 30a which protrudes forward and contacts the first stopper portion 25 of the inward support bracket 212.

The longitudinally-long band-shaped portion of the drive link 30 is configured such that a front end thereof is rotatably supported at a front end of a roof bracket 125 which is provided at the front roof 121 and a roughly-central portion, in the vehicle longitudinal direction, thereof is fixedly connected to the rear roof 122.

Meanwhile, to a lower end of the vertically-long band-shaped portion of the drive link 30 is fixed the driven gear 24 which engages with the intermediate gear 23 as shown in FIGS. 6 and 8. Further, the lower end of the vertically-long band-shaped portion of the drive link 30 is pivotally supported, together with the driven gear 24, at respective portions of the outward support bracket 211 and the inward support bracket 212 which are located above the beltline BL.

Specifically, the lower end of the vertically-long band-shaped portion of the drive link 30 is pivotally supported, together with the driven gear 24, at a specified positon which is located in front of the rotational center of the drive gear 222 and above the beltline BL, having its rotational shaft extending in the vehicle width direction. Herein, a pivotally-supporting portion of the link support bracket 21 to the driven gear 24 and the drive link 30 is set to be a driven-gear pivotal support portion 28.

The plural driven links comprise, as shown in FIG. 8, a first driven link 31, a second driven link 32, and a third driven link 33 which are connected to the drive link 30, a fourth driven link 34 which is connected to the front roof 121, a fifth driven link 35 which is connected to the second driven link 32, and a sixth driven link 36 which is connected to the third driven link 33.

The first driven link 31 is, as shown in FIG. 8, a roughly band-shaped plate member, and arranged such that its longitudinal direction matches substantially the vehicle vertical direction in a state where the openable roof 12 is closed. Specifically, the first driven link 31 is configured such that one end thereof is rotatably connected to a rear end of the longitudinally-long band-shaped portion of the drive link 30 and the other end thereof is rotatably connected to a lower end of the back window bracket 133.

The second driven link 32 is, as shown in FIG. 8, a roughly band-shaped plate member, and arranged such that its longitudinal direction matches substantially the vehicle vertical direction in the state where the openable roof 12 is closed. Specifically, the second driven link 32 is configured such that one end thereof is rotatably connected to a portion of the drive link 30 which is positioned in front of a connection portion of the drive link 30 to the first driven link 31 and the other end thereof is rotatably connected to an upper end of the back window bracket 133.

The third driven link 33 is, as shown in FIG. 8, a roughly-flat plate having a roughly-triangular shape in the side view, and arranged such that one of its corner portions is positioned on the vehicle upward side. Specifically, the third driven link 33 is configured such that the upward-positioned corner portion is rotatably connected to an upper portion of the vertically-long band-shaped portion of the drive link 30 and a rearward-positioned corner portion is rotatably connected to a roughly-central portion of the second driven link 32.

The fourth driven link 34 is, as shown in FIG. 8, a roughly band-shaped plate member, and arranged such that its longitudinal direction matches substantially the vehicle longitudinal direction in the state where the openable roof 12 is closed. Specifically, the fourth driven link 34 is configured such that one end thereof is rotatably connected to a rear end of the roof bracket 125 and the other end thereof is rotatably connected, together with the third driven link 33, to a roughly-central portion of the second driven link 32.

The fifth driven link 35 is, as shown in FIG. 8, a roughly band-shaped plate member, and arranged such that its longitudinal direction matches substantially the vehicle vertical direction in the state where the openable roof 12 is closed. Specifically, the fifth driven link 35 is configured such that one end thereof is rotatably connected to a portion of the second driven link 32 which is positioned on the upward side of a connection portion of the second driven link 32 to the third driven link 33 and the other end thereof is rotatably connected to a roughly-central portion of the third driven link 33.

The sixth driven link 36 is, as shown in FIG. 8, a roughly band-shaped plate member, and arranged such that its longitudinal direction matches substantially the vehicle vertical direction in the state where the openable roof 12 is closed. Specifically, the sixth driven link 36 is configured such that one end thereof is rotatably connected to a downward-positioned corner portion of the third driven link 33 and the other end thereof is rotatably connected to the driven link support portion 212*a* of the link support bracket 21.

The above-described roof opening/closing mechanism 20 moves the openable roof 12 and the back window portion 13 in a folding manner and store them in the storing compartment S. Specifically, through a switch operation by the passenger who wants storing of the openable roof 12 in the storing compartment S in the state where the openable roof 12 is closed, the deck cover 11 moves upward and rearward, and then the drive motor 221 starts its rotating.

A drive force of the drive motor 221 is transmitted to the driven gear 24 via the intermediate gear 23, so that the drive link 30 starts its rotating rearward and downward around the driven-gear pivotal portion 28.

Herein, the drive link 30 rotates the rear roof 122 along a rotational locus having a rotational radius R1 with its rotational center of driven-gear pivotal portion 28 located above the beltline BL as shown in FIG. 9A. This rotational radius R1 is shorter than a rotational radius R2 in a case where the driven-gear pivotal portion 29 is located on the beltline BL, for example, as shown in FIG. 9B.

In accordance with the rearward-and-downward rotation starting of the drive link 30, the first driven link 31, the second driven link 32, the third driven link 33, the fourth driven link 34, the fifth driven link 35, and the sixth driven link 36 start their rotating around their respective connection points.

The plural driven links which have started their rotating rotate the back window portion 13 forward and upward in such a manner that a front face of the back window portion 13 faces upward. Further, the plural driven link rotate the front roof 121 forward and downward in such a manner that a lower face of the rear roof 122 and a lower face of the front roof 121 face each other in the vehicle vertical direction.

Thus, the drive link 30 and the plural driven links store the openable roof 12 and the back window portion 13 in the storing compartment S, folding the rear roof 122, the back window portion 13, and the front roof 121 such that these members overlap each other in order from above.

The above-described link structure of the openable roof of the automotive vehicle 1 can compatibly attained the storing of the openable roof 12 in the vehicle body and the arranging of the drive device to drive the link mechanism at the vehicle body and the desired-shaped beltline. Specifically, the present link structure of the openable roof 12 of the automotive vehicle 1 can easily arrange the driven-gear pivotal portion 28 at the higher level than the beltline BL by locating the intermediate gear 23 at the specified level such that the intermediate gear 23 overlaps the beltline BL in the side view.

Accordingly, the present link structure of the openable roof 12 of the automotive vehicle 1 can make the distance between the driven-gear pivotal portion 28 and the openable roof 12 shorter than that in a case where the driven-gear pivotal portion 28 is located at a lower level than the beltline BL, that is, the rotational radius R1 of the rotation of the opening/closing locus of the openable roof 12 can be properly small.

Thereby, even in the case where the beltline BL is configured in the slant shape such that its rear side is elevated in the side view or the beltline BL is configured such that its rear side is positioned on the inward side, in the vehicle width direction, of the vehicle relative to its front side (i.e., the throttling shape), the present link structure of the openable roof 12 of the automotive vehicle 1 can prevent the opening/closing locus of the openable roof 12 from overlapping the narrow portion of the beltline BL or the floor face of the storing compartment S. That is, even in the case where the beltline BL is configured in the slant shape such that its rear side is elevated in the side view or the beltline BL is configured such that its rear side is positioned on the inward side, in the vehicle width direction, of the vehicle relative to its front side (i.e., the throttling shape), the present link structure of the openable roof 12 of the automotive vehicle 1 can eliminate the necessity of making the whole length of the automotive vehicle 1 long or making the vehicle height high.

Accordingly, even in the case where the beltline BL is desired to have the slant shape with its rear side elevating in the side view or to have the throttling shape with its rear side positioned on the inward side, the present link structure of the openable roof 12 of the automotive vehicle 1 can easily secure the storing compartment S having the opening which is large enough to store the openable roof 12.

Further, since the drive unit 22 is positioned on the outward side, in the vehicle width direction, of the intermediate gear 23, the present link structure of the openable roof 12 of the automotive vehicle 1 can secure a large cabin space between the right-and-left beltlines BL properly, compared to a case where the drive unit 22 is provided on the inward side, in the vehicle width direction, of the beltline BL, for example. Thus, the present link structure of the openable roof 12 of the automotive vehicle 1 can compatibly attain the storing of the openable roof 12 in the vehicle body and the arranging of the drive device to drive the link mechanism at the vehicle body and the desired-shaped beltline.

Further, since the intermediate gear 23 is provided such that its gear shaft center is positioned in back of the imaginary straight line which connects the gear shaft center of the drive gear 222 and the gear shaft center of the driven gear 24 in the side view, the present link structure of the openable roof 12 of the automotive vehicle 1 can compatibly attain the desired-shaped beltline BL and the storing of the openable roof 12 in the vehicle body and also make the drive device properly small-sized.

Specifically, the distance, in the vehicle vertical direction, between the gear shaft center of the driven gear 24 and the gear shaft center of the drive gear 222 can be smaller than that in a case where the gear shaft center of the driven gear 24, the gear shaft center of the intermediate gear 23, and the gear shaft center of the drive gear 222 are aligned in the vehicle vertical direction, for example.

Therefore, since the distance, in the vehicle vertical direction, between the drive unit 22 and the driven gear 24 can be small, the small-sized drive device to drive the drive link 30 can be attained.

Further, since the imaginary straight line which connects the gear shaft center of the driven gear 24, the gear shaft center of the intermediate gear 23, and the gear shaft center of the drive gear 222 forms substantially the triangle in the side view, the present link structure of the openable roof 12 of the automotive vehicle 1 can create a specified space in front of the intermediate gear 23.

This specified space is located at a position crossing a rotational locus of the drive link 30, so that the present link structure of the openable roof 12 of the automotive vehicle 1 can arrange the first stopper portion 25 to restrict the rotation of the drive link 30 in the specified space. Thereby, the present link structure of the openable roof 12 of the automotive vehicle 1 can provide the first stopper portion 25 as well, attaining the small-sized drive device.

Thus, the present link structure of the openable roof 12 of the automotive vehicle 1 can compatibly attain the desired-shaped beltline BL and the storing of the openable roof 12 in the vehicle body and also make the drive device properly small-sized by means of the intermediate gear 23 having the gear shaft center which is positioned in back of the imaginary straight line connecting the gear shaft center of the drive gear 222 and the gear shaft center of the driven gear 24.

Moreover, since the drive link 30 is configured such that one end thereof is pivotally supported at the driven-gear pivotal portion 28 and the other end thereof is connected to the openable roof 12, the present link structure of the openable roof 12 of the automotive vehicle 1 can improve the support rigidity of the openable roof 12.

Specifically, since the driven-gear pivotal portion 28 and the openable roof 12 can be connected by a single member, compared to a case where the openable roof 12 is supported by the drive link pivotally supported at the driven-gear pivotal portion 28 and the driven link pivotally supported at the drive link, the present link structure of the openable roof 12 of the automotive vehicle 1 can improve the support rigidity of the openable roof 12.

Thus, the present link structure of the openable roof 12 of the automotive vehicle 1 can not only compatibly attain the desired-shaped beltline BL and the storing of the openable roof 12 in the vehicle body but improve the support rigidity of the openable roof 12.

Moreover, since the intermediate gear 23 is configured to have a larger diameter than the drive gear 222, the present link structure of the openable roof 12 of the automotive vehicle 1 can secure a smooth engaging between the drive gear 222 and the intermediate gear 23 and improve the durability of these two gears, compared to a case where these gears 222, 23 have substantially the same diameter.

In correspondence between the present invention and the above-described embodiment, the storing-type roof of the present invention corresponds to the openable roof 12 of the embodiment. Likewise, the pivotal portion corresponds to the driven-gear pivotal portion 28, the link mechanism corresponds to the drive link 30, the first driven link 31, the second driven link 32, the third driven link 33, the fourth driven link 34, the fifth driven link 35, and the sixth driven link 36, and the drive device corresponds to the drive unit 22, the intermediate gear 23, and the driven gear 24. However, the present invention should not be limited to the above-described embodiment, and any other modifications or improvements may be applied within the scope of a spirit of the present invention.

For example, while the above-described embodiment exemplifies the metal-made openable roof 12, a synthetic resin-made openable roof or a soft top-type openable roof made of an awning cloth and an awning bow may be applied.

Further, while the drive unit 22 which comprises the worm interposed between the drive motor 221 and the drive gear 222 is used in the above-described embodiment, a drive unit in which a drive gear is directly connected to the output shaft of the drive motor 221 having its rotational shaft extending in the vehicle width direction may be applied.

Moreover, while the driven gear 24 which is formed independently (separately) from the drive link 30 is used in the above-described embodiment, a driven gear which is formed integrally with the drive link 30 may be used. Additionally, while the link mechanism comprising the drive link 30 and the plural driven links is used, any structure can be applied as long as the drive link is pivotally supported at a positon located above the beltline BL and the link mechanism stores the openable roof 12 and the back window portion 13 in the storing compartment S.

What is claimed is:

1. A link structure of a storing-type roof of an automotive vehicle, comprising:
   a storing-type roof configured to openably cover an opening formed above a cabin and be stored in a storing compartment of the vehicle body;
   a link mechanism including a drive link pivotally supported at a vehicle body via a pivotal portion and foldably supporting the storing-type roof; and
   a drive device to rotationally drive the drive link around a rotational axis of the pivotal portion,
   wherein said drive device comprises a drive unit including a drive motor and a drive gear connected to the drive motor, a driven gear provided at said drive link and having a gear shaft center thereof which matches the pivotal portion of said drive link, and an intermediate gear engaging with said drive gear and said driven gear, said drive unit is located at a lower level than a beltline of the vehicle body, said pivotal portion is located at a higher level than the beltline of the vehicle body, and said intermediate gear is located on an inward side, in a vehicle width direction, of said drive motor and at a specified level such that the intermediate gear overlaps the beltline of the vehicle body in a side view.

2. The link structure of the storing-type roof of the automotive vehicle of claim 1, wherein said intermediate gear is provided such that a gear shaft center thereof is positioned in back of an imaginary straight line which connects a gear shaft center of said drive gear and the gear shaft center of said driven gear in the side view.

3. The link structure of the storing-type roof of the automotive vehicle of claim 2, wherein said drive link of the link mechanism is configured such that one end thereof is pivotally supported at said pivotal portion and the other end thereof is connected to said roof.

4. The link structure of the storing-type roof of the automotive vehicle of claim 1, wherein said drive link of the link mechanism is configured such that one end thereof is pivotally supported at said pivotal portion and the other end thereof is connected to said roof.

* * * * *